United States Patent
Ikeda

(10) Patent No.: US 6,438,177 B1
(45) Date of Patent: Aug. 20, 2002

(54) DIGITAL SATELLITE BROADCASTING RECEIVE IN WHICH LOOP BANDWIDTH OF PLL CIRCUIT IS CHANGED AT THE TIME OF CENTERING

(75) Inventor: Hitoshi Ikeda, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/026,978

(22) Filed: Feb. 20, 1998

(30) Foreign Application Priority Data

Feb. 21, 1997 (JP) .............................................. 9-037631

(51) Int. Cl.7 .............................................. H04L 27/14
(52) U.S. Cl. ...................................................... 375/316
(58) Field of Search .......................... 455/161.1, 188.1; 375/316

(56) References Cited

U.S. PATENT DOCUMENTS

| | | | |
|---|---|---|---|
| 4,131,862 A | * 12/1978 | Black et al. .................... | 331/4 |
| 4,352,208 A | * 9/1982 | Schroeder .................... | 455/266 |
| 4,546,330 A | 10/1985 | Okada | |
| 5,023,939 A | * 6/1991 | Hori ........................... | 455/188 |
| 5,113,152 A | * 5/1992 | Norimatsu .................... | 331/11 |
| 5,121,414 A | * 6/1992 | Levine et al. ................. | 375/343 |
| 5,272,452 A | 12/1993 | Adachi et al. | |
| 5,389,899 A | 2/1995 | Yahagi et al. | |
| 5,533,059 A | * 7/1996 | Tsuda .......................... | 375/327 |
| 5,739,874 A | * 4/1998 | Badger et al. ............... | 348/731 |

FOREIGN PATENT DOCUMENTS

| | | |
|---|---|---|
| EP | 0405523 | 1/1991 |
| EP | 0593015 | 4/1994 |
| EP | 0664617 | 7/1995 |
| EP | 0782270 | 7/1997 |
| EP | 0782271 | 7/1997 |
| JP | 2-046045 | 2/1990 |
| JP | 8275081 | 10/1996 |
| WO | 9639745 | 12/1996 |

* cited by examiner

*Primary Examiner*—Chi Pham
*Assistant Examiner*—Kevin M Burd

(57) ABSTRACT

A digital satellite broadcasting receiver include: a channel selecting circuit having a channel selecting PLL; a carrier recovery circuit receiving an output from the channel selecting circuit and having a carrier recovery PLL; a switching circuit for switching a loop bandwidth of the channel selecting PLL; and a control circuit for controlling the switching circuit such that the loop bandwidth of the channel selecting PLL circuit is made narrower at the time of centering than in a normal receiving state or at a time of channel selection. Instead of temporarily narrowing the loop bandwidth of the channel selecting PLL, the loop bandwidth of the carrier recovery PLL may be temporarily widened. The method of centering within the receiver includes narrowing the loop bandwidth of the channel selecting PLL; changing a synchronizing frequency of the channel selecting PLL so as to minimize the amount of carrier offset obtained from the demodulated signal; and widening the loop bandwidth of the channel selecting PLL.

16 Claims, 7 Drawing Sheets

DIGITAL SATELLITE BROADCASTING RECEIVE IN WHICH LOOP BANDWIDTH OF PLL CIRCUIT IS CHANGED AT THE TIME OF CENTERING

BACKGROUND OF THE INVENTION

1. Field of the Invention

The present invention relates to a digital satellite broadcasting receiver for receiving, demodulating and processing broadcasting signals from a satellite, for example, to output data. More specifically, the present invention relates to a digital satellite broadcasting receiver not susceptible to noise and almost free from the possibility of losing carrier lock in a PLL circuit for carrier recovery at the time of centering.

2. Description of the Background Art

In a digital satellite broadcasting receiver, a channel of the satellite broadcasting signal is selected by a channel selecting circuit, the signal is converted to an IF (Intermediate Frequency) signal and subjected to IQ demodulation to be an analog IQ signal of pseudo baseband. The analog IQ signal is further converted to a digital signal and demodulated at a QPSK (Quadrature Phase Shift Keying) demodulating section, subjected to a prescribed signal processing, and output as data.

The QPSK demodulating section includes a carrier recovery section, which carrier recovery section detects any frequency error and an optimal phase. The channel selecting circuit has a PLL (Phase Locked Loop) and when a frequency divider in the PLL is provided with data for frequency division from a control circuit, the channel selecting circuit can select channels and change frequency stepwise.

The QPSK demodulating section provides demodulated data. However, even at this time point, there still remains carrier offset. Therefore, centering of the satellite broadcasting receiver is necessary to minimize the offset.

Conventionally, centering is performed in the following manner. FIG 8 is a flow chart of the control circuit at time of centering in a conventional digital satellite broadcast receiver. Referring to FIG. 8, a carrier offset signal is read from the QPSK demodulating section (S5). Frequency of the PLL of the channel selecting circuit is changed one step by one stop in a direction of reducing the amount of carrier offset (S10), and when it is detected that the amount of carrier offset attains to be smaller than the step width of the channel selecting PLL (S15), centering operation is completed (S20). This is because further correction is not possible when the amount of carrier offset is smaller than the stop width of the channel selecting PLL.

Such a conventional technique has quick response and is strong against shock noise when the loop bandwidth of the channel selecting PLL is wide. However, when the channel selecting frequency of the channel selecting PLL is shifted one step by one step at the time of centering, the carrier recovery PLL of the QPSK demodulating section in the succeeding stage cannot follow the channel selecting PLL, so that carrier lock is lost. Conversely, when the loop bandwidth of the carrier recovery PLL of the succeeding stage is made wider, there is less possibility that the carrier recovery PLL fails to follow the channel selecting PLL. However, it is more likely that characteristics against signal noise are deteriorated in normal reception, resulting in inferior bit error rate.

SUMMARY OF THE INVENTION

Therefore, an object of the present invention is to provide a digital satellite broadcasting receiver capable of preventing increase in noise in normal receiving state while maintaining carrier lock of the carrier recovery PLL at the time of centering, and to provide the method thereof.

Another object of the present invention is to provide a digital satellite broadcasting receiver capable of preventing increase in noise in normal receiving state while allowing a carrier recovery PLL to follow an operation of a channel selecting PLL at the time of centering, and to provide the method thereof.

Another object of the present invention is to provide a digital satellite broadcasting receiver in which response of a channel selecting PLL is made slow enough to allow a carrier recovery PLL to follow at the time of centering and the response for channel selection is made quick in normal receiving state, and to provide the method thereof.

The digital satellite broadcasting receiver in accordance with the present invention includes: a channel selecting circuit having a first PLL circuit; a carrier recovery circuit receiving an output from the channel selecting circuit and having a second PLL circuit; a switching circuit for switching loop bandwidth of the first PLL circuit; and a control circuit for controlling the switching circuit such that the loop bandwidth of the first PLL circuit is made narrower at the time of centering than in the loop bandwidth a normal receiving state and/or at a time of channel switching time of centering.

In the digital satellite broadcasting receiver structured as described above, the bandwidth of the first PLL circuit for channel selection is wide at the time of channel selection and in the normal receiving state, so that response for channel selection is quick and therefore the receiver is less susceptible to shock noise. At the time of centering, the bandwidth of the first PLL circuit for channel selection is made narrower, so that the second PLL circuit of the carrier recovery circuit easily follows the operation of the first PLL circuit, and therefore it is less likely that the carrier lock is lost.

Preferably, the channel selecting circuit has a first function for tuning, based on an applied control signal, with a channel selecting frequency designated by the control signal, and a second function of changing one step by one step an oscillation frequency of the first PLL circuit. The channel selecting circuit further controls the switching circuit when it performs the second function such that the loop bandwidth of the first PLL circuit is made narrower than when it performs the first function.

According to another aspect of the present invention, the digital satellite broadcasting receiver includes: a channel selecting circuit having a first PLL circuit; a carrier recovery circuit receiving an output from the channel selecting circuit and having a second PLL circuit; a switching circuit for switching loop bandwidth of the second PLL circuit; and a control circuit for controlling the switching circuit such that the loop bandwidth of the second PLL circuit is made wider than in a normal receiving state and at the time of channel switching, at the time of centering.

The method of centering in a digital satellite broadcasting receiver in accordance with a still further aspect of the present invention includes the steps of: narrowing loop bandwidth of a PLL circuit for channel selection included in a channel selecting circuit; in the PLL circuit of which loop bandwidth is made narrower, changing a synchronizing frequency of the PLL circuit so that an amount of carrier offset obtained from a demodulated signal is minimized; and after the amount of carrier offset obtained from the demodulated signal is minimized, widening the loop bandwidth of the PLL circuit.

The method of centering in a digital satellite broadcasting receiver in accordance with an additional aspect of the present invention includes the steps of: widening loop bandwidth of a carrier recovery PLL circuit of the digital satellite broadcasting receiver; thereafter, in a PLL circuit included in a channel selecting circuit of the digital satellite broadcasting receiver, changing a synchronizing frequency so that an amount of carrier offset obtained from a demodulated signal is minimized; and after the amount of carrier offset obtained from the demodulated signal is minimized, narrowing the loop bandwidth of the carrier recovery PLL circuit.

The foregoing and other objects, features, aspects and advantages of the present invention will become more apparent from the following detailed description of the present invention when taken in conjunction with the accompanying drawings, wherein like elements are represented by like reference numerals, which are given by way of illustration only, and thus are not limitative of the present invention, and wherein:

DESCRIPTION OF THE PREFERRED EMBODIMENTS

Figure 1:
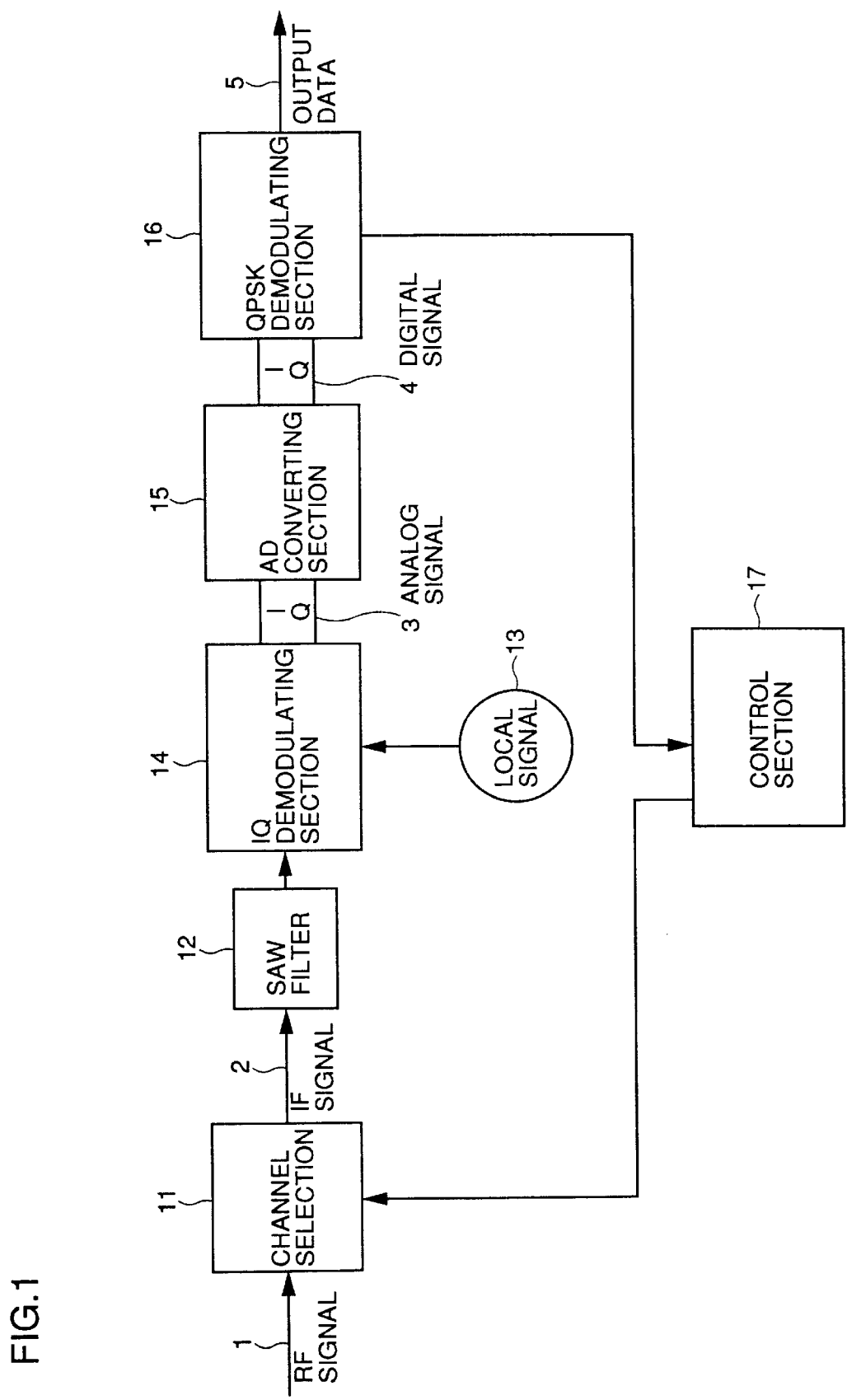
FIG. 1 is a block diagram of a digital satellite broadcasting receiver in accordance with an embodiment of the present invention.

FIG. 1 is a block diagram of a digital satellite broadcast receiver in accordance with an embodiment of the present invention.

Referring to FIG. 1, the digital satellite broadcasting receiver includes a channel selecting section 11 receiving an RF (Radio Frequency) signal, an SAW (Surface Acoustic Wave) filter 12 acting on an IF signal 2 provided as an output from channel selecting section 11, an IQ demodulating section 14 receiving an output from SAW filter 12 and a local signal 13, an AD (Analog-to-Digital) converting section 15 for converting analog I and Q signals 3 output from IQ demodulating section 14 to digital signals, a QPSX demodulating section 16 receiving I and Q signals 4 output from AD converting section 15 and providing output data 5, and a control section 17 for overall control of the digital satellite broadcasting receiver. Control section 17 includes a microcomputer and a program executed by the microcomputer, for example.

Figure 2:
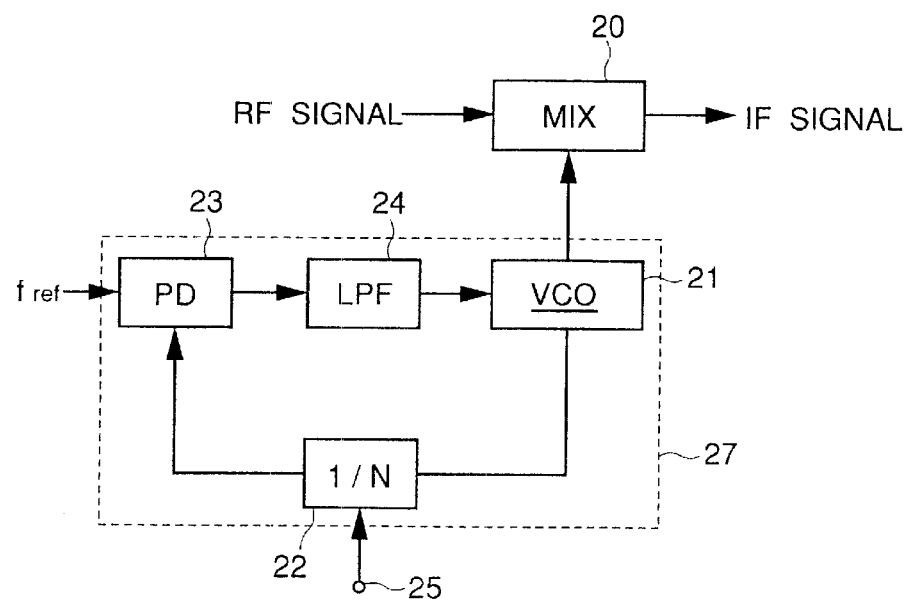
FIG. 2 is a block diagram showing a detailed structure of a channel selecting PLL section in the digital satellite broadcasting receiver shown in FIG. 1.

FIG. 2 is a block diagram showing a detailed structure of a channel selecting PLL section in the digital satellite broadcasting receiver shown in FIG. 1.

Referring to FIG. 2, channel selecting section 11 includes a mixer 20 for converting the received RF signal to the IF signal, and a PLL section 27 for applying a local oscillation signal to mixer 20. PLL section 27 in channel selecting section 11 will be hereinafter referred to as channel selecting PLL.

Channel selecting PLL 27 includes a voltage controlled oscillator (VCO) 21 which is under PLL control and providing an output to mixer 20, and a programmable frequency divider 22 for dividing an output frequency of oscillator 21 by a factor N. The dividing factor N of frequency divider 22 is applied from control section 17 through a terminal 25 shown in FIG. 1. Channel selecting PLL. 27 further includes a phase comparator 23 receiving a reference frequency fREF and an output from frequency divider 22, and a low pass filter 24 receiving an output from phase comparator 23. An output from low pass filter 24 is applied to oscillator 21 and oscillation frequency of oscillator 21 is controlled thereby.

Figure 3:
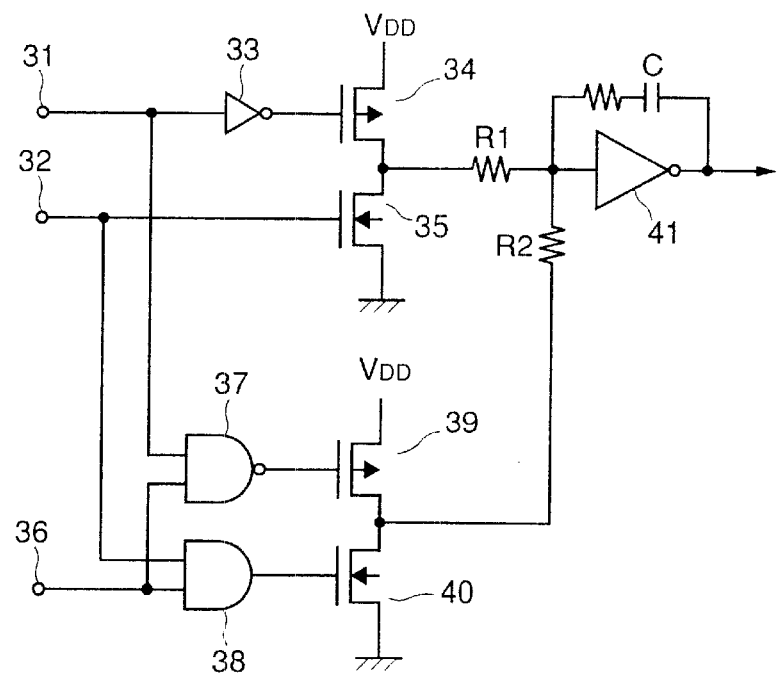
FIG. 3 is a circuit diagram showing a detailed structure of a low pass filter in the channel selecting PLL section shown in FIG. 2.

FIG. 3 is a circuit diagram showing a detailed structure of a low pass filter in the channel selecting PLL section shown in FIG. 2.

Referring to FIG. 3, low pass filter 24 has a control terminal 36 and two terminals 31 and 32 receiving an output from phase comparator 23. A signal "1" or "0" is applied from control section 17 shown in FIG. 1 to control terminal 36.

Low pass filter 24 includes an inverter 33, P channel MOS transistors 34 and 39, N channel MOS transistors 35 and 40 resistors R1 and R2, a buffer 41, an NAND gate 37, an AND gate 38 and a capacitor C.

Inverter 33 has an input connected to terminal 31. Inverter 33 has an output connected to the gate of transistor 34. Transistor 34 has its source connected to a power supply voltage VDD. Transistor 34 has its drain connected to the drain of transistor 35 and further to one end of resistors R1. Transistor 35 has its gate connected to terminal 32 and its source grounded.

NAND gate 37 has one input connected to terminal 31 and the other input connected to control terminal 36, respectively. NAND gate 37 has an output connected to the gate of transistor 39. AND gate 38 has one input connected terminal 32 and the other input connected to control terminal 36, respectively. AND gate 38 has an output connected to the gate of transistor 40.

Transistor 39 has its source connected to the power supply potential $V_{DD}$. Transistor 39 has its drain connected to the drain of transistor 40 and further to one end of resistors R2. Transistor 40 has its source grounded.

The other terminals of resistors R1 and R2 are connected to each other, to an input of buffer 41 and to one end of capacitor C. The other end of capacitor C is connected to an output of buffer 41.

Figure 4:
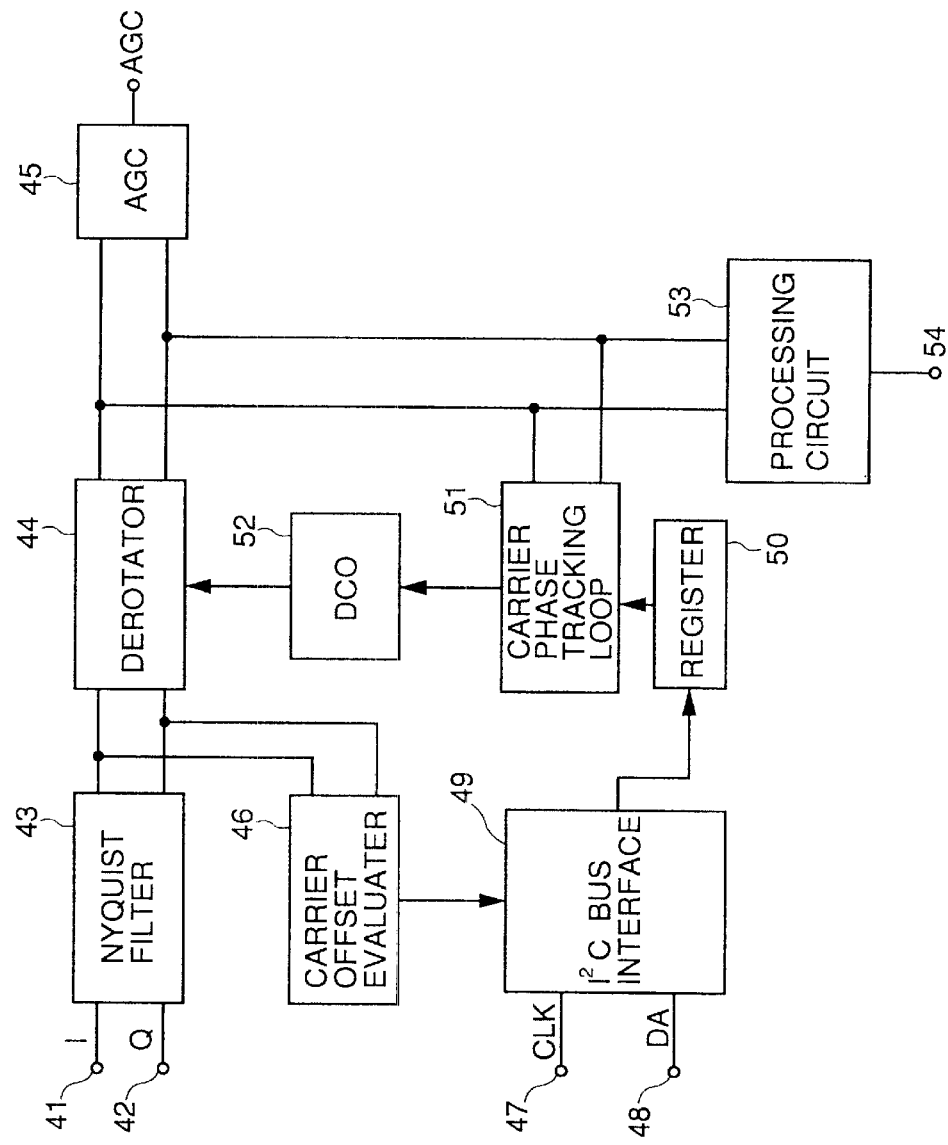
FIG. 4 is a detailed block diagram of a QPSK demodulating section of the digital satellite broadcasting receiver shown in FIG. 1.

FIG. 4 is a detailed block diagram of a QPSK demodulating section of the digital satellite broadcasting receiver shown in FIG. 1.

Referring to FIG. 4, QPSK demodulating section 16 shown in FIG. 1 has input terminals 41 and 42 to which digital I and Q signals are applied, respectively, a terminal 48 for data DA and a terminal 47 for a clock CLK, and includes a Nyquist filter 43, a derotator 44, an automatic gain control (AGC) circuit 45, a carrier offset evaluater 46, an I²C bus interface 49, a register 50, a carrier phase tracking loop 51, a DCO 52 and a processing circuit 53.

Nyquist filter 43 has two inputs connected to terminals 41 and 42, respectively. Nyquist filter 43 has its output connected to derotator 44 and carrier offset evaluater 46. Derotator 44 is for substantially demodulating I and Q signals, and its output is connected to AGC circuit 45, processing circuit 53 and carrier phase tracking loop 51. Processing circuit 53 is for performing various processing of the demodulated I and Q signals, and provides an output to output terminal 54.

Carrier phase tracking loop 51 has its output connected to an input of DCO 52. DCO 52 has its output connected to derotator 44. Carrier offset evaluater 46 has its output connected to I²C bus interface 49. I²C bus interface 49 has two inputs connected to clock terminal 47 and data terminal 48, and an output connected to register 50. Register 50 has its output connected to carrier phase tracking loop 51.

By applying an output from carrier phase tracking loop 51 to DCO 52, carrier recovery is performed, and a recovered carrier signal is supplied to derotator 44. Carrier phase tracking loop 51 also has a PLL circuit (hereinafter referred to as "carrier recovery PLL"), of which bandwidth is set by data stored in register 50. An amount of carrier offset output from carrier offset evaluater 46 is transmitted through I²C bus interface 49 from data terminal 48 to control section 17 of FIG. 1.

Control section 17 passes set value data to register 50 through terminal 48. The set value data is stored in register 50 through I²C bus interface 49. The set value data stored in register 50 determines the bandwidth of the carrier recovery PLL.

Referring to FIG. 3, in operation, low pass filter 24 of channel selecting PLL 27 performs the following function. At the time of normal operation and channel switching, "0" is applied to control terminal 36. As a result, a second charge pump section constituted by transistors 39 and 40 does not operate. Only a first charge pump section constituted by transistors 34 and 35 is made operable. Rate of charging/discharging capacitor C is defined by a time constant CR1 of capacitor C and resistor R1.

Conversely, at the time of centering, "1" is applied to control terminal 36, as will be described in the following. At this time, not only the first charge pump section but also the second charge pump section is made operable. The rate of charging/discharging capacitor C is defined by a time constant C·R1·R2/(R1+R2). This value is smaller than the time constant CR1 when the first charge pump section only operates. Accordingly, when the first and second charge pumps both operate, bandwidth per one step is smaller than when only the first charge pump section operates. More specifically, by changing charge pump current, which is the base current of the transistor constituting LPF 24, which is an active filter of channel selecting PLL 27, time constant of the time constant circuit including R1, R2 and C is changed, so that the speed of response and loop bandwidth of the channel selecting PLL are changed.

Figure 5:
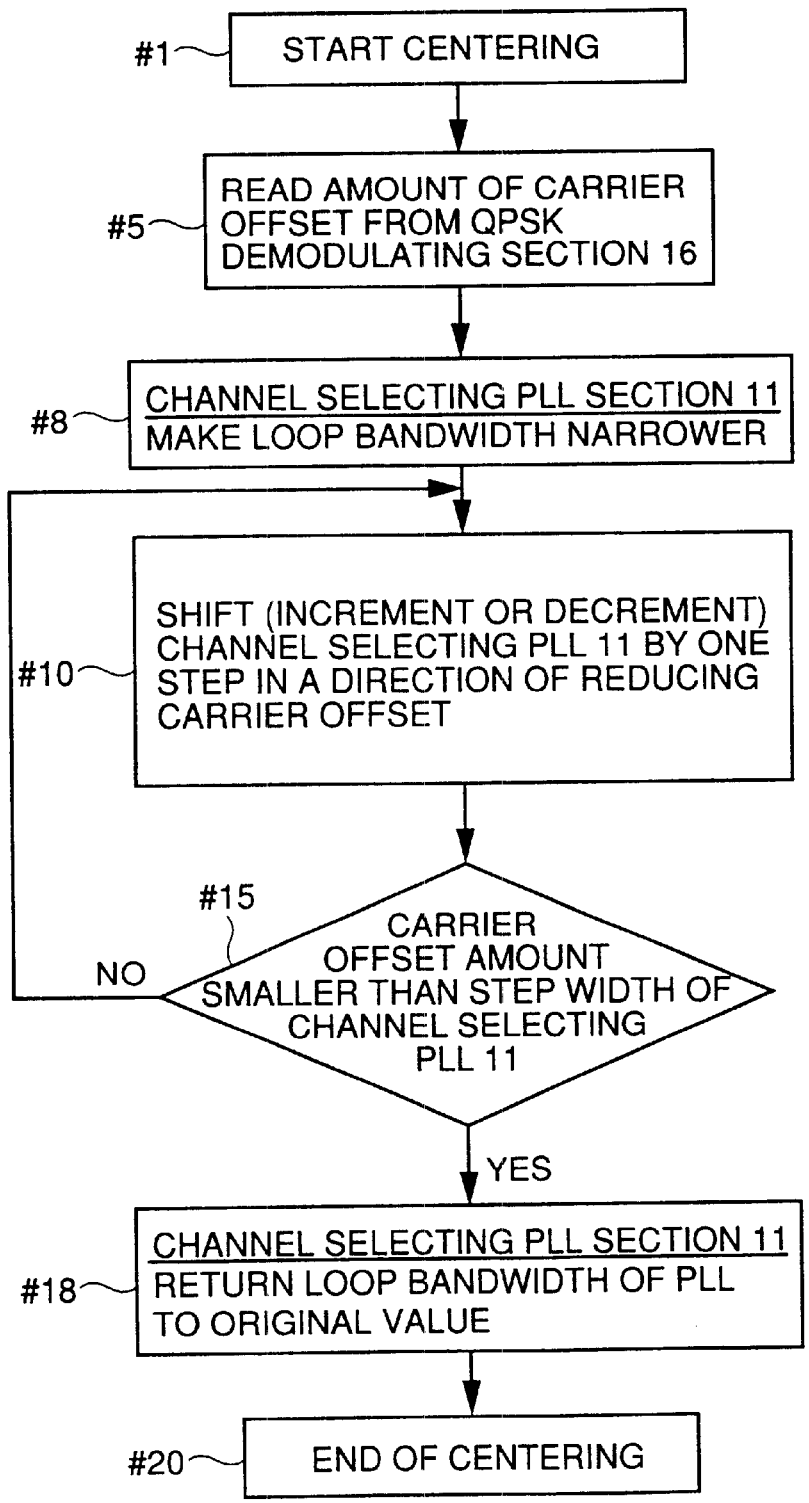
FIG. 5 is a flow chart showing an operation of a control circuit at the time of centering in the digital satellite broadcasting receiver in accordance with a first embodiment.

FIG. 5 is a flow chart showing an operation of a control circuit at the time of centering in the digital satellite broadcasting receiver in accordance with a first embodiment.

Control section 17 operates in the following manner when centering of the satellite broadcasting receiver is performed. Referring to FIG. 5, an amount of carrier offset from QPSK demodulating section 16 is received (#5), and the loop bandwidth of channel selecting PLL 27 is made narrower than in normal receiving state or than at the time of channel selection (#8). The loop bandwidth can be made narrower by applying "1" to control terminal 36 shown in FIG. 3, as described above.

Thereafter, a channel selecting frequency of channel selecting PLL 27 is shifted by one step in a direction of reducing carrier offset (#10). It is determined whether the amount of carrier offset is smaller than the step width of channel selecting PLL 27 (#15). When the amount of carrier offset is smaller than the step width, control proceeds to #18, and the loop bandwidth of channel selecting PLL 27 is returned to the original width by applying "0" to control terminal 36 of FIG. 3 (#18).

By the above described process performed by control section 17, centering of the satellite broadcasting receiver is completed (#20). When it is determined in step #15 that the amount of carrier offset is not smaller than the step width of the channel selecting PLL, control returns to #10, and the channel selecting frequency of the channel selecting PLL is further shifted by one step.

Figure 6:
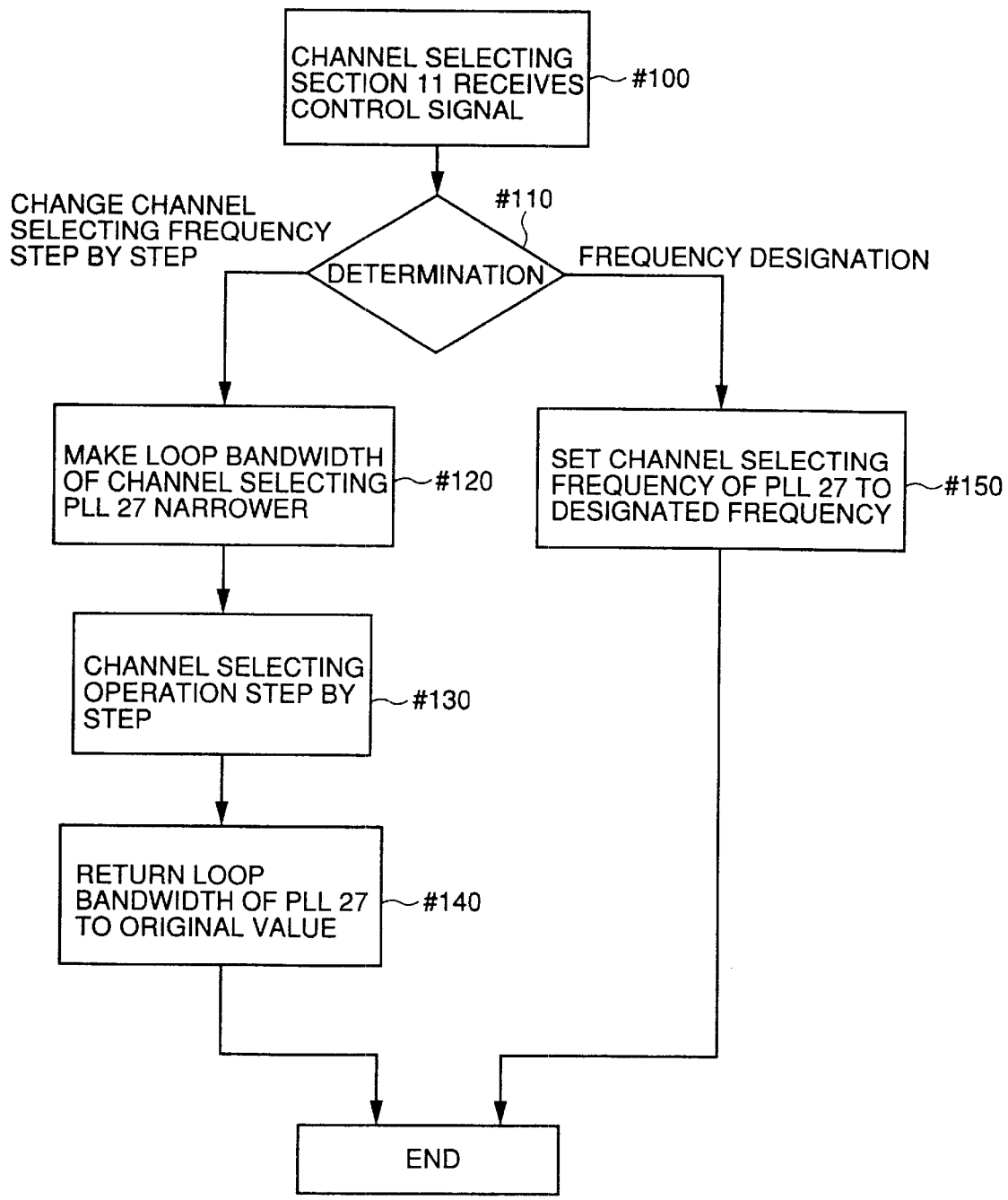
FIG. 6 is a flow chart showing an operation of the channel selecting PLL in the digital satellite broadcasting receiver in accordance with the first embodiment.

FIG. 6 is a flow chart showing an operation of the channel selecting PLL in the digital satellite broadcasting receiver in accordance with the first channel selecting section 11 operates in the following manner. Referring to FIG. 6, first, channel selecting section 11 receives a control signal (#100). Channel selecting section 11 determines whether the control signal designates change of the channel selecting frequency by one step, or designates a channel selecting frequency (#110).

When it is determined that the control signal designates change of the channel selecting frequency by one step, then channel selecting section 11 narrows the loop bandwidth of channel selecting PLL 27 (#120). Thereafter, channel selecting section 11 selects a channel by changing the channel selecting frequency step by step (#130). After completion of such channel selecting operation, channel selecting section 11 sets the loop bandwidth of channel selecting PLL 27 to the original value (#140).

When it is determined in step #110 that the control signal designates a channel selecting frequency, then channel selecting section 11 selects a channel designated by frequency division data corresponding to the designated frequency, applied to terminal 25 of FIG. 2 (#150).

In this manner, in the present embodiment, response of channel selecting PLL is made slow by narrowing loop width of channel selecting PLL 27 at the time of centering of the satellite broadcasting receiver. Therefore, carrier recovery PLL of QPSK demodulating section 16 in the succeeding stage well follows the operation of channel selecting PLL 27, whereby possibility of losing carrier lock is reduced. In normal receiving state, the channel selecting PLL has wide bandwidth. Therefore, the PLL has quick response and is strong against oscillation and noise. The problem of deteriorated bit error rate even in the normal reception experienced when the loop width of the carrier recovery PLL is made wider, can be avoided. Further, possibility of losing carrier lock of the carrier recovery PLL is smaller at the time of centering as well as at the time of channel selection.

Figure 7:
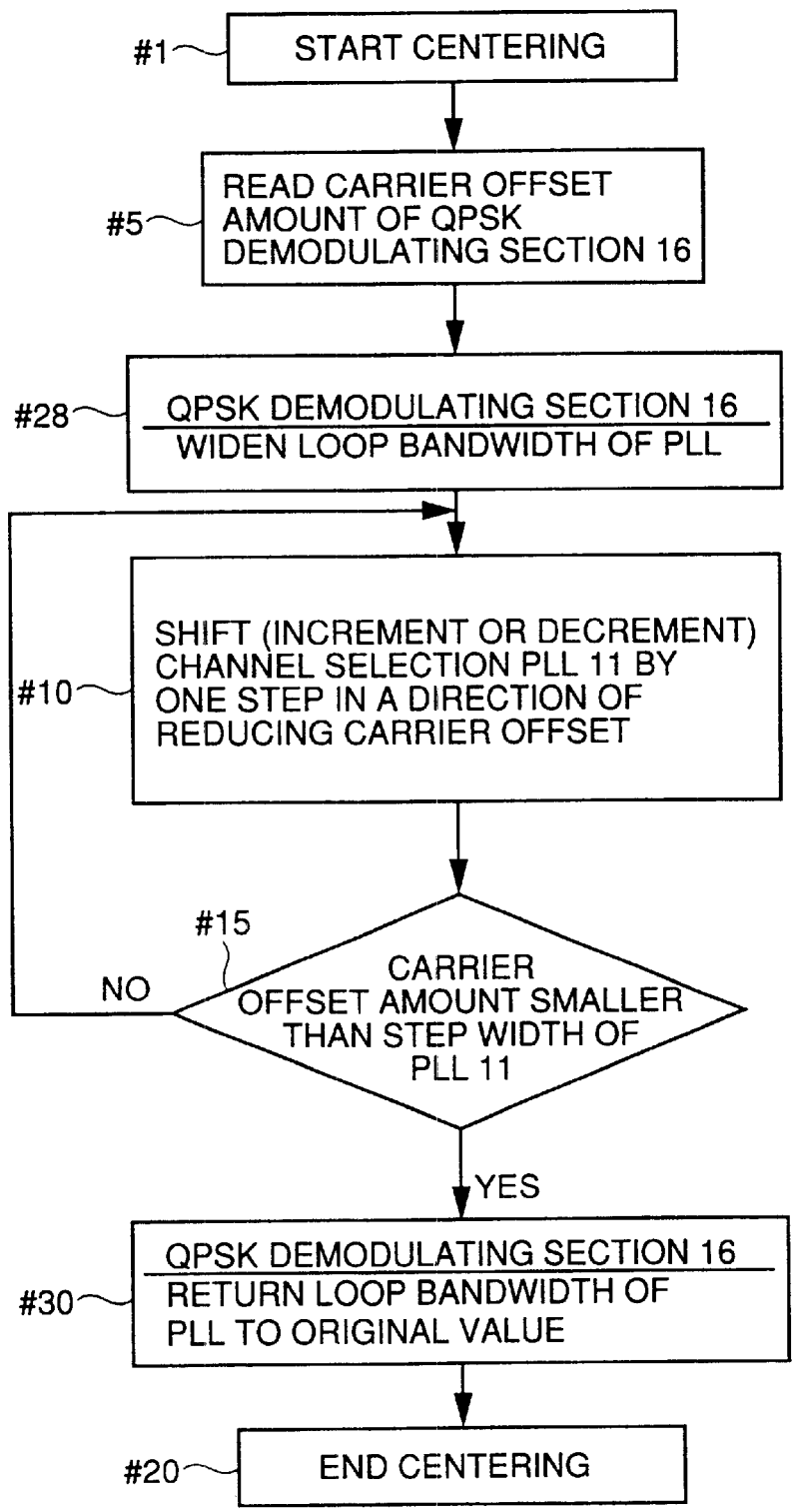
FIG. 7 is a flow chart showing an operation of the control circuit at the time of centering in the digital satellite broadcasting receiver in accordance with a second embodiment.
Figure 8:
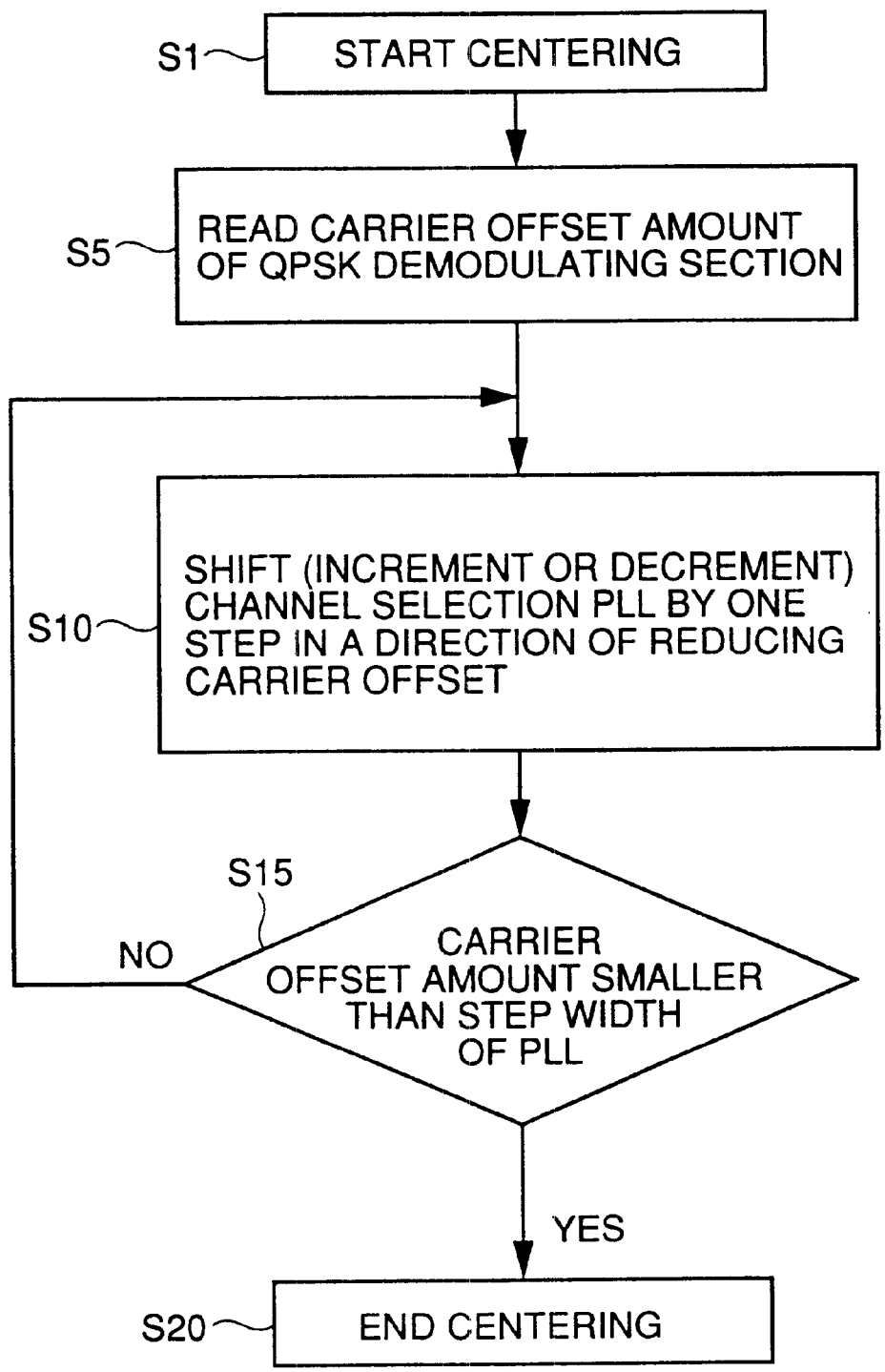
FIG. 8 is a flow chart of the control circuit at the time of centering in a conventional digital satellite broadcasting receiver.

FIG. 7 shows a flow chart of operation at the time of centering, of control section 17 in the digital satellite broadcasting receiver in accordance with a second embodiment of the present invention. The digital satellite broadcasting receiver in accordance with the second embodiment is the same as the digital satellite broadcasting receiver in accordance with the first embodiment except the operation of control section 17 at the time of centering. Therefore, detailed description of the hardware and so on is not repeated.

Referring to FIG. 7, at the time of centering, control section 17 of the digital satellite broadcasting receiver in accordance with the second embodiment receives an amount of carrier offset from QPSK demodulating section 16 (#5), and widens the loop bandwidth of the carrier recovery PLL of QPSK demodulating section 16 (#28). More specifically, different from the first embodiment in which the loop bandwidth of channel selecting PLL 27 is made narrower, the loop bandwidth of carrier recovery PLL is made wider.

Thereafter, the channel selecting frequency of channel selecting PLL 27 is shifted by one step in a direction of reducing carrier offset (#10). Whether the amount of carrier offset is smaller than the step width of channel selecting PLL 27 is determined (#15). When the amount of carrier offset is smaller than the step width, control proceeds to #30, where the loop bandwidth of carrier recovery PLL is returned to the original width (#30).

By the above described process performed by control section 17, centering of the satellite broadcasting receiver is completed (#20). When it is determined in step #15 that the amount of carrier offset is not smaller than the step width of channel selecting PLL 27, control returns to #10, and the PLL in the QPSK demodulating section is further shifted by one step.

In the digital satellite broadcasting receiver in accordance with the second embodiment, response of the PILL in QPSK demodulating section is made faster at the time of centering. Therefore, the PLL in QPSK demodulating section can follow the operation of channel selecting PLL 27. In the normal state or at the time of channel selection, the bandwidth of the PLL in QPSK demodulating section is returned to the original value. Therefore, characteristics against signal noise are not deteriorated in normal reception, and tendency of inferior bit error rate can be avoided.

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. A digital satellite broadcasting receiver, comprising:
   a channel selecting section for outputting a frequency of a selected channel, includes a first PLL circuit having a frequency that is manipulated for channel selection;
   a demodulation section that receives an output from said channel selecting section and which determines a carrier frequency offset of said received output, said demodulation section having a second PLL circuit for carrier recovery;
   a switching circuit for switching a loop bandwidth of said first PLL circuit from an original value; and
   a control circuit connected between said channel selecting section and said demodulation section for controlling said switching circuit based on the amount of carrier offset that is fed back from said demodulation section, such that the loop bandwidth of said first PLL circuit is made narrower at time of centering than in a normal receiving state or at a time of channel selection,
   wherein said frequency of said first PLL circuit is a channel selecting frequency that is shifted in one-step increments to select a channel in the direction of reducing carrier frequency offset, until it is determined that said carrier frequency offset is less than a step width of said first PLL circuit, whereafter said channel selection section returns the first PLL circuit's loop bandwidth to its original value.

2. The digital satellite broadcasting receiver according to claim 1, wherein
   said channel selecting section further includes a first function for tuning a channel selecting frequency designated by a control signal received from said control section, and a second function for said stepwise changing of the frequency of said first PLL circuit; and
   wherein said channel selecting circuit further controls said switching circuit such that the loop bandwidth of said first PLL circuit is narrowed more when said second function is performed, as compared to the narrowing of loop bandwidth when said first function is performed.

3. The digital satellite broadcasting receiver according to claim 2, wherein
   said switching circuit includes a time constant switching circuit for switching a time constant of a time constant element of an active filter of a loop in said first PLL circuit.

4. The digital satellite broadcasting receiver according to claim 3, wherein
   said time constant switching circuit includes means responsive to a control signal from said control circuit for switching a charge pump current to said time constant element.

5. The digital satellite broadcasting receiver according to claim 1, wherein
   said switching circuit includes time constant switching circuit for switching a time constant of a time constant element of an active filter of a loop of said first PLL circuit.

6. The digital satellite broadcasting receiver according to claim 5, wherein said time constant switching circuit includes means responsive to a control signal from said control circuit for switching a charge pump current to said time constant element.

7. A digital satellite broadcasting receiver, comprising:
   a channel selecting section for outputting a frequency of a selected channel, which includes a first PLL circuit having a frequency that is manipulated for channel selection;
   a demodulation section that receives an output from said channel selecting section and which determines a carrier frequency offset of said received output, said demodulation section having a second PLL circuit for carrier recovery;
   a switching circuit for switching a loop bandwidth of said second PLL circuit from an original value; and
   a control circuit connected between said channel selecting section and said demodulation section for controlling said switching circuit based on the amount of carrier offset determined in said demodulation section, such that the loop bandwidth of said second PLL circuit is made wider at time of centering than in a normal receiving state or at a time of channel selection,
   wherein said frequency of said first PLL circuit is a channel selecting frequency that is shifted in one-step increments to select a channel in the direction of reducing carrier frequency offset, until it is determined that said carrier frequency offset is less than a step width of said first PLL circuit, whereafter said channel selection section returns the second PLL circuit's loop bandwidth to its original value.

8. The digital satellite broadcasting receiver according to claim 7, wherein said switching circuit includes a register for storing and applying to said second PLL circuit a set value for switching the loop bandwidth of said second PLL circuit.

9. A method of centering a digital satellite broadcasting receiver, comprising:

narrowing a loop bandwidth of a PLL circuit for channel selection included in a channel selecting circuit by reducing a time constant of a time constant element that constitutes an active filter of said PLL circuit;

changing a synchronizing frequency of said PLL circuit so that an amount of carrier offset, which is determined from a demodulated signal and fed back to a control circuit for manipulating the bandwidth of the PLL circuit, is minimized after said narrowing; and widening the loop bandwidth of said PLL circuit after said carrier offset has been minimized by enlarging said time constant back to its original value.

10. The method of claim 9, wherein said reducing and enlarging of said time constant is effected by selective operation of first and second charge pump sections within said active filter, so that said time constant is reduced and bandwidth of said PLL circuit is narrowed when both charge pumps of said active filter are in operation.

11. A digital satellite broadcast receiver, comprising:

a channel selecting circuit which includes a first PLL circuit for channel frequency selection;

a carrier recovery circuit receiving an output from said channel selecting circuit and including a second PLL circuit for carrier recovery;

a switching circuit switching a time constant constituting an active filter within said first PLL circuit to change loop bandwidth of said first PLL circuit; and a control circuit for controlling said switching circuit so that said first PLL circuit's loop bandwidth is narrowed at a time of centering, as compared to loop bandwidth in a normal receiving state or at a time of channel selection, wherein said control circuit sends a data signal to said switching circuit to change loop bandwidth that is based on an output carrier frequency offset that is determined by the carrier recovery circuit and fed back to said control circuit.

12. A digital satellite broadcast receiver, comprising:

a channel selecting section for outputting a frequency of a selected channel, which includes a channel selecting PLL circuit having a frequency that is manipulated for channel selection;

a QPSK demodulating section for demodulating an output from said channel selecting section to obtain a demodulated signal, and for determining a carrier frequency offset of said received output, wherein said QPSK demodulating circuit includes a carrier recovery PLL circuit having a loop bandwidth; and a control section connected between said channel selecting section and said QPSK demodulation section, wherein the control section widens the loop bandwidth of the carrier recovery PLL circuit based on the determined offset, controls step-wise changing of channel selecting frequency of said channel selecting PLL circuit until said determined carrier offset falls below a predetermined value, and thereafter controls narrowing of the loop bandwidth of the carrier recovery PLL circuit back to its previous value.

13. The digital satellite broadcast receiver of claim 12, further comprising a register for storing a first set value for widening the bandwidth of the carrier recovery PLL circuit, and for storing a second set value for narrowing the bandwidth of the carrier recovery PLL circuit.

14. A method of centering a digital satellite broadcasting receiver, comprising:

determining an amount of carrier frequency offset that is present in a selected channel frequency signal that has been demodulated, said determination performed in a QPSK demodulation section;

feeding back said determined offset to a control section;

sending a first data signal from said control section to a channel selecting section that is based on said fed back offset, said first data signal effecting a change in a synchronizing frequency of a channel selecting PLL of said channel selecting section to narrow loop bandwidth of said channel selecting PLL until a predetermined condition is met, and thereafter sending a second data signal from said control section to said channel selecting section to return loop bandwidth of said channel selecting PLL to its previous value.

15. A method of centering a digital satellite broadcasting receiver, comprising:

determining an amount of carrier frequency offset that is present in a selected channel frequency signal that has been demodulated, said determination performed in a QPSK demodulation section;

feeding back said determined offset to a control section;

sending a first data signal from said control section to said demodulation section to widen loop bandwidth of a carrier recovery PLL within said QPSK demodulation section until a predetermined condition is met, and thereafter sending a second data signal from said control section to said channel selecting section to return loop bandwidth of said carrier recovery PLL to its previous value.

16. A digital satellite broadcast receiver, comprising:

a channel selecting section for outputting a frequency of a selected channel, which includes a channel selecting PLL circuit having an oscillating frequency that is manipulated for channel selection, and also a loop bandwidth;

a QPSK demodulating section for demodulating an output from said channel selecting section to obtain a demodulated signal, and for determining a carrier frequency offset of said received output, wherein said QPSK demodulating circuit includes a carrier recovery PLL circuit; and a control section connected between said channel selecting section and said QPSK demodulation section, wherein the control section narrows the loop bandwidth of the channel selecting PLL circuit based on the determined offset that is fed back to the control section from the QPSK demodulation section, controls step-wise changing of channel selecting frequency of said channel selecting PLL circuit until said determined carrier offset falls below a predetermined value, and thereafter controls widening of the loop bandwidth of the channel selecting PLL circuit back to its previous value.

* * * * *

UNITED STATES PATENT AND TRADEMARK OFFICE
CERTIFICATE OF CORRECTION

PATENT NO. : 6,438,177 B1
DATED : August 20, 2002
INVENTOR(S) : Hitoshi Ikeda

It is certified that error appears in the above-identified patent and that said Letters Patent is hereby corrected as shown below:

<u>Title page,</u>
Item [54], should read:

-- DIGITAL SATELLITE BROADCASTING RECEIVER IN WHICH LOOP BANDWIDTH OF PLL CIRCUIT IS CHANGED AT THE TIME OF CENTERING --

Signed and Sealed this

Eleventh Day of March, 2003

JAMES E. ROGAN
*Director of the United States Patent and Trademark Office*